Dec. 11, 1934.  C. W. PROCHASKA  1,984,155
SWAGING TOOL FOR PISTON RING GROOVES
Filed May 6, 1932
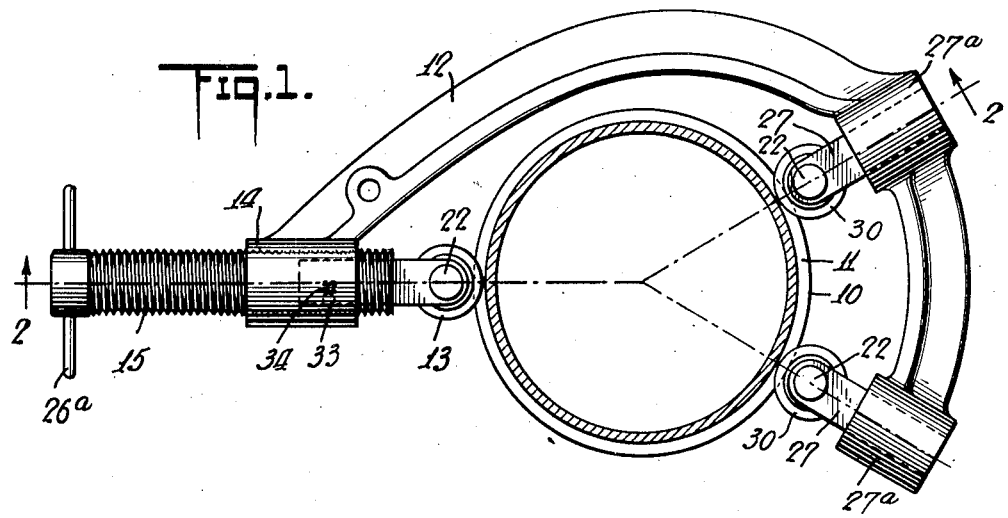
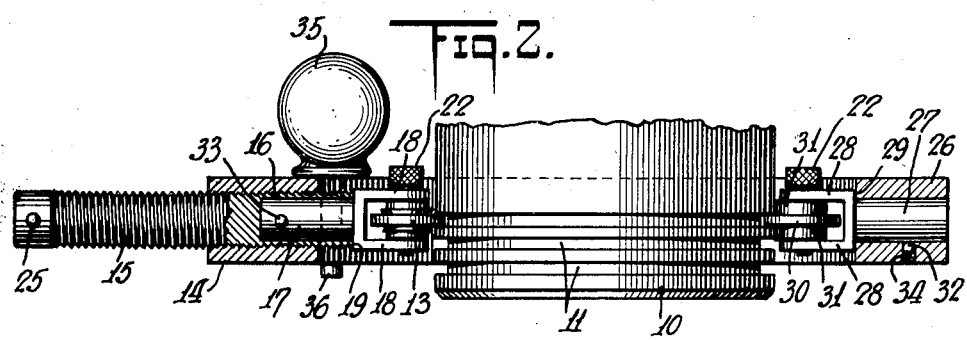
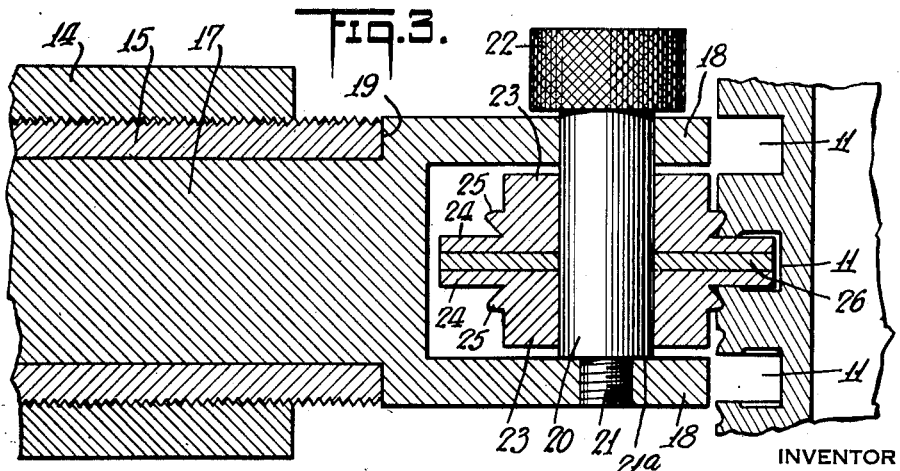
INVENTOR
Carroll W. Prochaska
BY
Dean Fairbank Hirsch & Foster
ATTORNEYS Patented Dec. 11, 1934

1,984,155

UNITED STATES PATENT OFFICE 1,984,155

SWAGING TOOL FOR PISTON RING GROOVES

Carroll W. Prochaska, New York, N. Y., assignor to Ramsey Accessories Manufacturing Corporation, St. Louis, Mo., a corporation of Missouri Application May 6, 1932, Serial No. 609,581

2 Claims. (Cl. 80—17)

The ring grooves in a piston of an internal combustion engine often become enlarged after long continued use, thereby permitting movement of the rings in the grooves and a pumping of lubricating oil.

One object of the present invention is to provide a simple and inexpensive tool for reconditioning these grooves so that they will firmly support the piston rings against movement other than radial, said tool being easily applied to the piston to be reconditioned, and being so constructed as to permit ready inspection and gauging of the grooves without the necessity of detaching the tool from its operating position.

As one important feature of the invention there is provided a frame carrying a swaging mechanism for operating on the groove to be reconditioned, said frame having the ends thereof interspaced to permit it to be moved radially of the piston into the position in which the swaging mechanism is operable on the piston. The space between the ends of the frame permits a portion of the piston's periphery to be left exposed, and readily accessible for inspection and gauging, and also permits the slipping of the ring into the groove for testing purposes, without the necessity of removing the tool or the swaging members from the piston.

As another important feature of the present invention, the swaging mechanism for operating on the groove is adjustable to permit its adaptability to piston grooves of various widths.

In the accompanying drawing, there is shown for the purpose of illustration, one form of device embodying the present invention. In the drawing Fig. 1 is an elevation of a tool embodying the present invention, and shown in operating position with respect to a piston, which latter is shown in section.

Fig. 2 is a section taken on line 2—2 of Fig. 1, and

Fig. 3 is a sectional detail on a larger scale, of a ring groove and the swaging mechanism operating thereon.

My invention is illustrated in operative position for reconditioning an engine piston 10, provided with the usual series of ring grooves 11. This tool comprises a hook-shaped frame 12, having the ends thereof interspaced, and carrying a swaging mechanism 13 for operating on the groove to be reconditioned. This mechanism 13 is advantageously supported from one end of the frame 12, which is provided for that purpose with a boss or block 14, having a threaded aperture for receiving a screw 15. The end of the screw 15 passing through the block 14 has a socket 16, for receiving one end of a spindle 17, the other end of which carries the swaging mechanism 13. For supporting this mechanism 13, the latter end of the spindle 17 has a pair of spaced prongs 18, carrying said mechanism therebetween, and forming shoulders 19 for abutting the inner end of the screw 15.

The swaging mechanism is made up of a plurality of sections which can be adjusted so as to permit its adaptability for operating on piston grooves of various widths. For that purpose, the mechanism includes a pin 20, one end of which is provided with a threaded stud 21 forming a shoulder 21a with the main portion of the pin, the other end having a knurled knob 22. This pin passes through one prong 18, and the stud 21 is threaded onto the other prong until the shoulder 21a abuts the inner surface of the latter prong, thereby providing a construction in which the pin which carries the swaging elements may be easily removed, and the swaging elements adjusted.

The swaging elements may be slipped off the pin 20 and comprise a pair of similar sections 23, each of which includes a guide roller 24 and a swaging roller 25 having the periphery thereof bevelled to provide a cutting edge. The width of the guide rollers 24 is such that when these rollers are mounted adjacent to each other they will have an aggregate width substantially equal to the width of the groove after being reconditioned.

If it is desired to adapt the swaging mechanism to a larger groove, a spacer 26 may be disposed between the two guide rollers 24 so that the aggregate width of the guide rollers 24 and the spacer 26 is sufficient to operate a groove of larger width. Any suitable size spacers 26 and any number of such spacers may be provided to reduce the width of a groove to any desired extent. For instance, for use on standard pistons having, respectively, grooves of $\frac{1}{8}$, $\frac{5}{32}$, and $\frac{3}{16}$ inches width, the width of each guide roller 24 may be $\frac{1}{16}$ of an inch so that by bringing the two guide rollers together, an aggregate width of $\frac{1}{8}$ of an inch is obtained. Either one of two spacers of $\frac{1}{32}$ and $\frac{1}{16}$ of an inch may be used. By means of these spacers, an aggregate width of $\frac{5}{32}$ of an inch is obtained with the $\frac{1}{32}$ inch spacer, and an aggregate width of $\frac{3}{16}$ of an inch is obtained with the $\frac{1}{16}$ inch spacer.

The cutting edges of the swaging rollers 25 are adapted to cut into the peripheral surface of the piston at a slight distance from the side edges of the groove being operated upon. The bevelled surfaces of the swaging rollers 25 diverge from the guide rollers 24 so that the material which is cut on both sides of the groove is forced or swaged towards the sides of said guide rollers, thereby reducing the width of the groove near the outer periphery thereof. The guide rollers 24 and spacers 26 serve as a means for limiting or defining the width of the reconditioned groove, these guide rollers and the spacers having an aggregate width equal to the desired width of the reconditioned groove. The swaging or cutting rollers cannot force the piston material inwardly in said groove, except to the extent that is permitted by the sides of said guide rollers 24 as shown in Fig. 3.

The swaging mechanism 13 is adjusted in position by means of the screw 15, the rotation of which serves to move said swaging mechanism into selected position along the axis of said screw. Suitable means are provided for turning the screw 15, as for instance, a handle 26a press-fitted in an aperture at the outer end of said screw. The spindle 17 is free to swivel in the socket 16 of the screw 15, so that the swaging rollers 25 may assume proper operating positions in conformance with the circumferential shape of the groove being operated upon as said rollers are forced along said groove.

In order to provide suitable means for supporting and guiding the frame 12 in its rotation about the piston, said frame has a pair of spaced apertured bosses or bearing blocks 27a, each of which receives a spindle 27 for carrying said members. For carrying said members, each spindle has a pair of spaced prongs 28 between which is journalled a roller 30, the width of which is slightly smaller than the width of the groove to be operated upon, so as to permit said roller to extend into said groove. These prongs 28 form shoulders 29 which abut the inner ends of their associated blocks 27a and serve to hold the spindles 27 in position against the force of the swaging mechanism 12. The two rollers 30, in conjunction with the rollers 24, serve as guides for maintaining the frame 12 in a plane at right angles to the axis of the piston during its operation.

For supporting the frame 12 in position over the piston, each spindle 27 has connected thereto a pair of bearing rollers 31 mounted on opposite sides of each roller 30, and having a smaller diameter than said last mentioned roller, to permit said bearing rollers to ride over the outer peripheries of the walls on both sides of the groove, while the intermediate guide roller 30 extends into the groove.

Spindles 17 and 27 are free to swivel in their respective blocks so that the members at the inner ends thereof will float and easily assume accurate positions in the circumferential plane of the groove in which they operate. Means are provided for retaining these spindles in their respective blocks, and preventing said spindles from falling out when the tool is not in use. Said means may take any suitable form, as for instance, there may be balls 32 and 33 urged by springs 34 into engagement with the surfaces of the spindles 27 and the inside surface of the socket 16 respectively. The pressure exerted by these balls 32 and 33 is not sufficiently great to prevent the swivelling of the spindles.

In order to properly balance the clamping forces of the tool acting on the outer periphery of the piston, the swaging rollers 22 and bearing rollers 31 are spaced and arranged so that their lines of force acting upon said periphery meet at a point. Preferably, the axes of the spindles 27 have equal inclinations with respect to the axis of the spindle 17, and intersect on the latter axis. By means of this arrangement, the resultant of the two forces applied by the two sets of bearing rollers 31 on the periphery of the piston, will always extend along the diameter of the piston being operated upon, and the line of force applied by the swaging mechanism 13 will be equal and opposite in direction to said resultant forces, thereby eliminating any resulting forces applied by the tool, which would tend to rotate the piston.

In reconditioning the ring grooves of a piston, the piston is first clamped in position by any suitable means, and the frame 12 of the reconditioning tool straddled over the piston, with the guide rollers 30 engaging the groove, and the bearing rollers 31 engaging the outer periphery of the piston. The screw 15 is then turned to move the guide rollers 24 into the groove, the rotation of this screw being continued until the swaging rollers 25 have cut into the metal adjoining the groove. As the rotation of this screw member 15 is continued, the metal cut on the sides of the groove, is forced towards the side of the rollers 24 by the bevelled surfaces on the rollers 25.

The tool having been adjusted in position, the operation of reconditioning the groove is performed by rotating the frame 12 about the piston. The complete operation of reconditioning the groove may be effected by several successive readjustments of the screw 15 as the metal is gradually swaged during rotation of the tool. The rotation of the frame 12 about the piston may be effected by manipulating the screw 15 as a turning handle. If desired, a separate handle may be provided in the form of a knob 35, having a spindle 36 passing through an aperture in the frame 12.

The metal on both sides of the groove need not be swaged into contact with the sides of the rollers 24. The construction of the tool is such as to permit ready inspection and gauging of the groove as it is being reconditioned, so that the groove may be narrowed to any desired width, said width being limited only by the outsides of the rollers 24.

The bearing rollers 31 not only serve to support the tool in position against the operating force of the swaging mechanism 13, but also serve to run down any protuberance formed on the periphery of the piston resulting from the operation of said swaging mechanism.

Having thus described my invention, what I claim as new and desire to secure by Letters Patent is:—

1. An apparatus for reconditioning the circumferential ring groove of a piston, which has been worn to enlarged width, including a frame, a pair of spaced spindles, said frame being provided with spaced apertures for receiving said spindles, means mounted on the inner ends of said spindles for engaging the groove at circumferentially spaced sections and for bearing on the outer periphery of said piston, whereby said frame is guided in a plane parallel to the plane of the groove to be reconditioned when said frame is rotated about the piston, said spindles being free to swivel to permit the means on the inner ends thereof to conform with the circumferential shape of the groove, and a swaging mechanism carried by said frame and adapted to swage the material on one side of the groove to force said material towards the interior of said groove, said mechanism being positioned to engage the periphery of the piston at a section oppositely to said bearing and guide means, said frame having the ends thereof spaced to provide an opening, whereby said frame may be easily straddled in position over said piston, and the groove being reconditioned readily inspected and gauged while said apparatus is in operating position with respect to said piston.

2. An apparatus for narrowing the circumferential ring groove of a piston, including a frame, a pair of spindles, said frame being provided with spaced apertures for receiving said spindles, means mounted on the inner ends of said spindles for bearing on the outer periphery of said piston, and for guiding said frame in a plane parallel to the plane of the groove when said frame is rotated about the piston, and including guide rollers adapted to extend in the groove, and bearing rollers mounted on both sides of said guide rollers, and adapted to ride over the surface of the piston, said spindles being free to swivel to permit the rollers on the inner ends thereof to conform with the circumferential shape of the groove, a swaging mechanism for operating on said groove, and including a spindle having a guide roller at one end thereof, adapted to extend into the groove to be reconditioned, and a pair of swaging rollers having cutting edges on the outer peripheries thereof, and bevelled surfaces diverging from said last mentioned guide roller, and adapted to force the cut material inwardly in the groove to reduce its width, and means for supporting said spindle in position on said frame, and including a screw member having a socket at one end thereof for receiving said last mentioned spindle, said frame having a threaded aperture for receiving said screw member, said frame having the ends thereof spaced to provide an opening, whereby said frame may be easily straddled in position over said piston and the groove easily inspected and gauged while said apparatus is in operating position with respect to said piston.

CARROLL W. PROCHASKA.